July 4, 1933.  S. H. EARL  1,917,103
APPARATUS FOR TRUING FACE MILL CUTTERS
Filed April 15, 1929   2 Sheets-Sheet 1

INVENTOR
SCHUYLER H. EARL
BY
ATTORNEY

July 4, 1933. S. H. EARL 1,917,103
APPARATUS FOR TRUING FACE MILL CUTTERS
Filed April 15, 1929 2 Sheets-Sheet 2

INVENTOR
SCHUYLER H. EARL
BY
ATTORNEY

Patented July 4, 1933

1,917,103

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

APPARATUS FOR TRUING FACE MILL CUTTERS

Application filed April 15, 1929. Serial No. 355,357.

The present invention relates to the truing of inserted blade cutters and in particular to the truing of double-ended blade face mill gear cutters.

The present invention has for its purpose among other objects to provide a simple, quick and efficient method of truing face mill gear cutters together with a simple, inexpensive and quickly manipulable fixture for carrying out the truing method.

Other features of the invention will appear from the following description when read in conjunction with the drawings and will be pointed out in the appended claims.

As the sides of the blade of a face mill gear cutter converge, in accordance with the pressure angle and number of the cutter, toward the tip of the blade, it will be seen that it is very essential to set the blades in such a cutter so that all extend the same distance from the face of the cutter head. Otherwise, some of the blades will be cutting narrower and others wider grooves in the gear blank.

The present invention while applicable to the truing up of all types of face mill gear cutters is especially adapted to the truing up of double-ended cutters. These double-ended face mill cutters have recently come into use particularly for the roughing of spiral bevel and hypoid gears. In these cutters, a plurality of annularly arranged blades are secured in the equi-spaced relation in a rotatable cutter head and each blade has cutting portions at both ends so that the cutter can be inverted end for end to use either ends of the blades. The blades of these cutters are made without shoulders so that they can be adjusted axially of the cutter head to set the blades to the correct height.

In truing up a cutter with the present invention, one of the blades in the cutter head is fixed for height and the other blades are adjusted so that they conform in position to the arbitrarily fixed blade. In the truing operation, a fixture is used which has a plurality of seats arranged about its center in conformity with the arrangement of the cutting blades on the cutter head. These seats have seating surfaces on their top faces which are inclined at an angle corresponding to the angle of relief of the tip faces of the cutting blades. The cutter to be trued is centered on the fixture and held thereon against axial movement. The cutter head is then rotated slightly on the fixture until the fixed blade engages its seat and the other blades are then tapped down into engagement with their respective seats. As they are already spaced accurately from each other around the head and as the seats are all at the same distance from the base of the fixture and have the same inclination, it is obvious that when all the blades are seated on the fixture their cutting portions will all extend the same distance from the face of the cutter head. So, when the blades are secured in their adjusted positions, the cutter will have been correctly trued for height.

Figure 1:
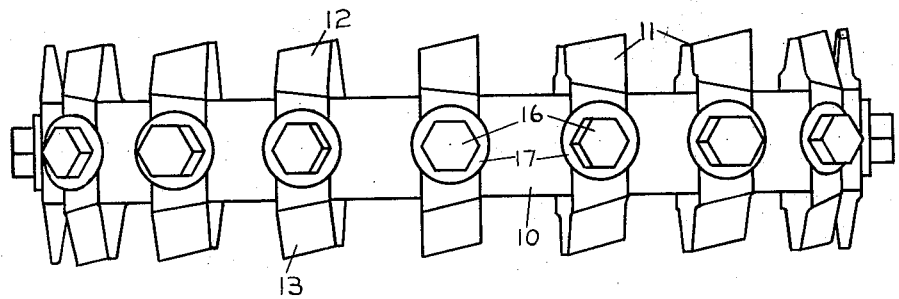
Figure 1 is a side elevation of a face mill cutter having double-ended cutting blades.
Figure 2:
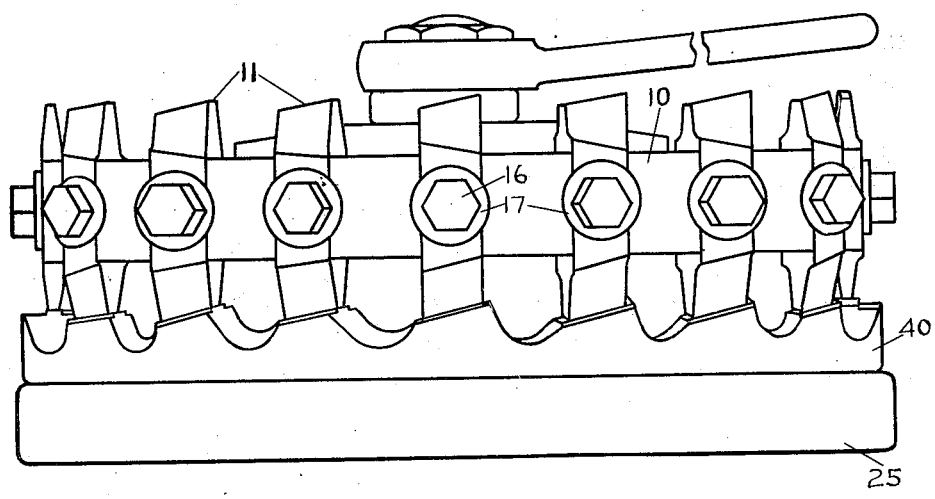
Figure 2 is a side elevational view showing this cutter positioned on a truing fixture constructed according to the present invention for the purpose of truing the blades of the cutter.
Figure 5:
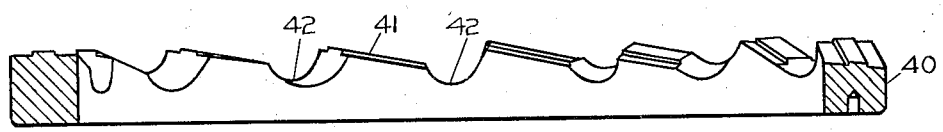
Figure 5 is a view of a detail of the truing fixture, showing in section the height ring.
Figure 3:
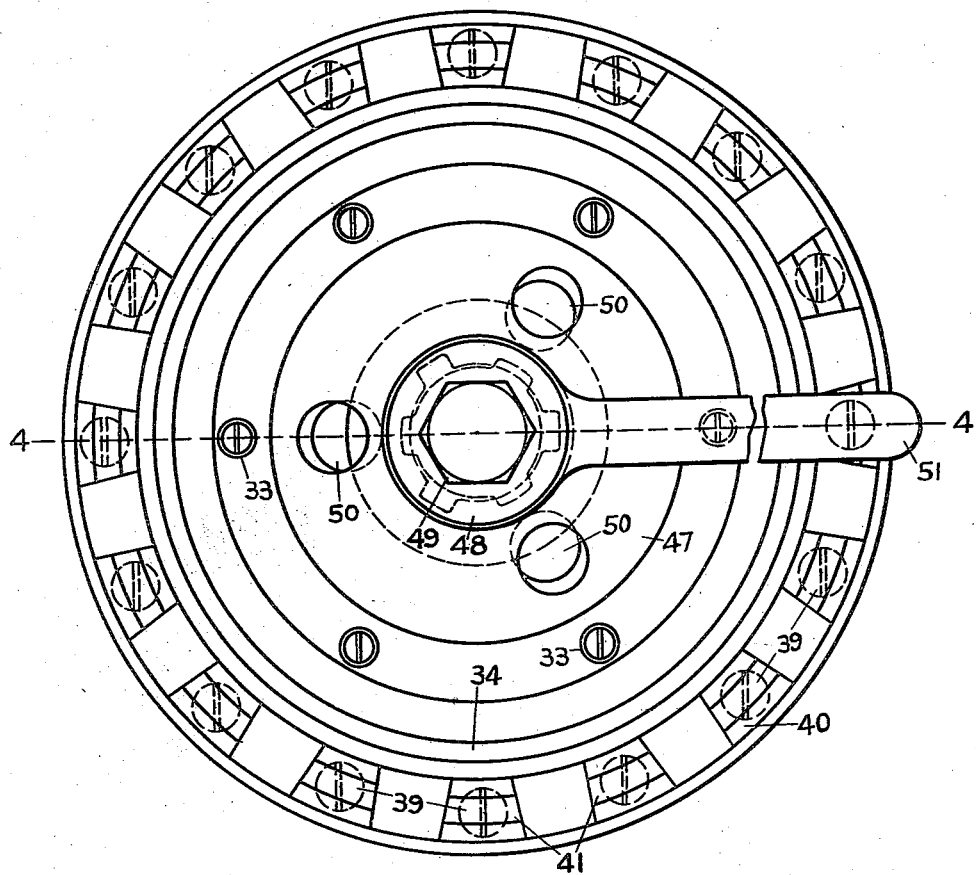
Figure 3 is a plan view of the truing fixture with the cutter removed.
Figure 4:
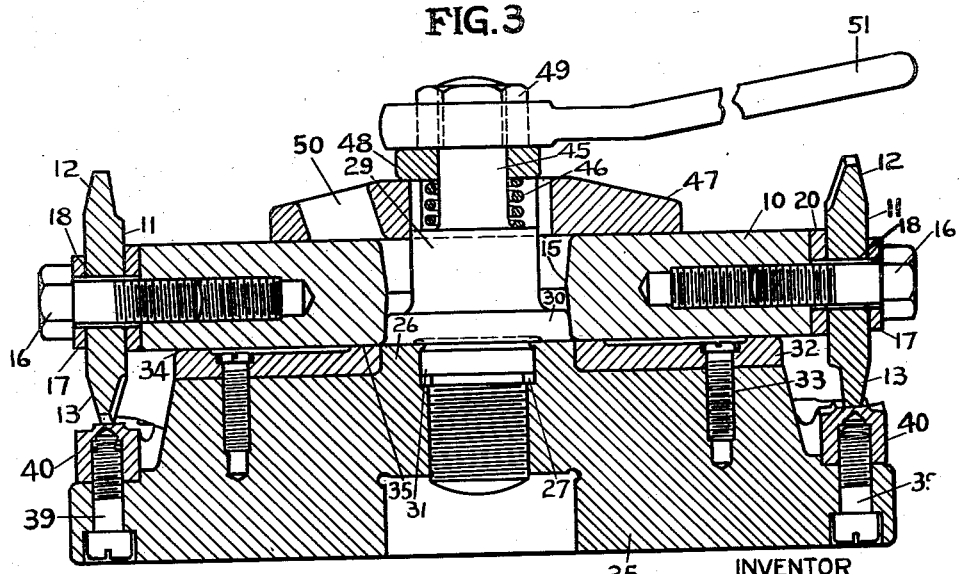
Figure 4 is a vertical sectional view of the cutter and fixture shown in Figure 2, the section being taken on a line such as the line 4—4 of Figure 3.

Referring now to the drawings by numerals of reference, 10 indicates the head of a face mill gear cutter and 11 the cutting blades. The blades shown in the drawings are of the double-ended type, that is, they are formed with cutting portions at both ends. 12 indicates the cutting portion at one end of each of the blades and 13 the cutting portion at the other end of the blades. At both ends, the cutting portions are relieved back of the side and top cutting edges to provide the necessary side and top cutting clearance. As will be seen in the drawings, opposite ends of the blades are oppositely relieved, that is, the cutting portions are oppositely directed at the two ends of the blades. They are so constructed in order to permit inverting the cutter end for end on the spindle of a gear cutting machine to use either end of the cutter for cutting a gear. It is not necessary to invert the individual blades separately. The bore of the cutter as indicated at 15 in Figure 4 is tapered from the opposite faces of the cutter head to the center to permit this bodily inversion of the cutter on the cutter spindle and the cutter can be trued with either ends of the blades seated on the truing fixture.

The cutter head 10 is provided with a plurality of spaced recesses or slots extending in a direction parallel to the axis of the cutter head and the blades 11 are secured in these slots. The blades are held in position on the cutter heads by the bolts 16 and washers 17. The holes 18 in the cutter blades 11 through which the bolts 16 pass are made of slightly greater diameter than the diameter of the bolt stems so that the blades can be adjusted slightly on the cutter head in an axial direction to permit of the truing operation as will be hereinafter described.

By the use of shims 20 of various sizes, slight changes in the diameters of the cutters can be made.

The cutter truing fixture comprises a generally circular base 25 that is formed on its upper face with a circular flange or seat 26 which is disposed centrally of the base. The center part of the base is recessed from the top as indicated at 27 and provided with a screw threaded opening below this recess. 29 designates a post or stud. This post or stud 29 is provided with a tapered collar 30, the lower face of which rests on the flange 26. Below the collar 30, the stud 29 is of reduced diameter and is provided with a second cylindrical collar 31 which fits in the circular recess 27 of the base and centers the stud in the base. The lower end of the stud below the collar 31 is threaded and screws into the threaded opening formed in the base 25 to assemble the stud on the base. Seated on the upper face of the base 25 and surrounding the flange 26 is a hardened steel disc 32 which is formed with two spaced circular seats 34 and 35, the upper faces of which lie in the same horizontal plane. This disc 32 is secured to the base by the screws 33. The seats 34 and 35 serve as a rest for the cutter to be trued and the cutter is centered on the base by the collar 30 of the stud 29 which is adapted to enter the taper at either end of the bore of the cutter.

The base 25 is formed in a horizontal plane below its top face with an annular seat on which the ring 40 is secured, as by means of the screws 39. This ring 40 is of a diameter corresponding to the diameter of the cutter to be trued. It is formed on its upper face with a plurality of seats 41, the uppermost points of which all lie in the same horizontal plane. The top faces of the seats are inclined to this horizontal plane at an angle corresponding to the relief angle of the tips of the cutter blades. The seats correspond in number, of course, to the number of blades in the cutter and the ring 40 may be grooved or notched between the successive seats as indicated at 42.

The stud 29 is of reduced diameter at its upper end as indicated at 45 in Figure 4. Surrounding this part 45 of the stud and resting on the shoulder formed thereby is a coiled spring 46. 47 designates a removable clamping disc that serves to hold the cutter to be trued on the truing fixture and 48 designates a lock washer which serves to secure the clamping disc 47 in position. The lock washer 48 is provided with three lugs or fingers disposed at 120° to each other and the clamping disc 47 is provided with three slots disposed at 120° apart which are shaped to correspond to the shape of the lugs of the lock washer with the consequence that when the clamping disc is rotated so that its slots align with the lugs of the lock washer, the clamping disc can be removed from the fixture by sliding it over the lock washer; while when the clamping disc is rotated so that its slots are out of alignment with the lugs of the lock washer, the clamping disc will be held in position to hold the cutter on the truing fixture. A nut 49 which is threaded on to the upper end of the reduced portion 45 of the stud 29 can be threaded up to force the clamping disc 47 into engagement with the cutter to be trued to secure the cutter against rotation on the fixture. The coil spring 46 serves to move the lock washer 48 upwardly when the nut 49 is unthreaded so as to release the clamping pressure on the clamping disc 47.

The clamping disc 47 may be formed with three finger grips 50, 120° apart to permit the operator to readily lift the clamping disc off of the fixture or put it on the same. A removable wrench 51 is provided for manipulating the nut 49.

In truing cutters with the device illustrated, one of the blades is first fixed in the cutter head as to height, in other words, so that the cutting portions or portion extend or extends the correct distance from the face of the cutter head. This may be done in any way or by the use of any suitable or convenient means. In the case of double-ended roughing cutter blades, it is quite easy for the operator to center one blade with reference to the bolt 16 by eye and then secure it in position.

With the other blades loosely held to the head by the bolts 16, the cutter head is placed on the truing fixture, the clamping disc 47 and wrench 51 having been first removed. The disc 32 serves to locate the cutter in a true horizontal plane and the collar 30 serves to center the cutter on the truing fixture. The clamping disc 47 is then slipped over the locking washer 48 and rotated relative to the washer to lock it on the fixture. With the cutter thus supported on the fixture, the operator then rotates the cutter slightly until the lower tip surface of the fixed blade contacts its seat 41 on the ring 40. The operator now takes the wrench 51 and threads up the nut 49 to lock the cutter head against rotation. He then taps the other blades of the cutter down until they rest on their respective seats 41 of the ring 40. This action adjusts the other blades to the same height as the fixed blade. The operator can now tighten up the bolts 16 to secure the other blades to the cutter head and the cutter will have been trued. The now trued cutter can be removed from the fixture after the nut 49 has been loosened up and the clamping disc 47 taken off the fixture. The spring 46 serves to release the pressure of the lock washer 48 on the clamping disc 47 when the nut 49 is unthreaded and the operator can then take the clamping disc 47 off the fixture by inserting his fingers in the finger grip 50, rotating the clamping disc until its slots are in alignment with the lugs of the lock washer 48 and then lifting the clamping disc up over the lock washer. The cutter 10 having been trued is ready for use on a gear cutting machine.

While the invention has been described in connection with a specific embodiment as, for instance, one in which the blade-seats 41 are formed as integral parts of a detachable ring member 40, it will be understood that the invention is capable of various modifications and embodiments, as will readily occur to those skilled in the art. Thus, for instance, separate pieces might be used for the several blade-seats, and each piece secured separately in position on the base of the fixture. In general, it may be said that the present application is intended to cover any variations, uses, or adaptations of my invention, following, in general, the principles of the invention and including such departures from the present disclosure as may come within known or customary practice in the gear art and as may be applied to the essential features hereinbefore set forth and as fall within the scope of the invention or the limits of the appended claims.

Having thus described my invention, what I claim is:

1. A truing fixture for face mill cutters comprising a support on which a cutter may be positioned and rotatably adjusted, and a plurality of seats arranged about said support in correspondence to the arrangement of the blades of the cutter on the cutter head, the top surface of each seat being inclined at an angle corresponding to the relief angle of the tip surfaces of the cutter blades.

2. A truing fixture for face mill cutters comprising a circular base on which the cutter may be centered and rotatably adjusted, and a plurality of seats, on which the tips of the blades of the cutter are adapted to rest, which are arranged about the center of the base on a circle corresponding in diameter to the diameter of the cutter, the top surfaces of said seats being inclined at an angle corresponding to the relief angle of the tip surfaces of said blades.

3. A truing fixture for face mill cutters comprising a support provided with a collar adapted to enter the bore of a cutter to locate the same on the base and having a plane upper face on which the cutter head is adapted to rest, and a plurality of seats arranged annularly on the support in a circle corresponding in diameter to the diameter of the cutter, said seats having their upper faces inclined to the plane of the face of said base at an angle corresponding to the relief angle of the tips of the blades of the cutter.

4. A truing fixture for face mill cutters comprising a support on which a cutter may be positioned and rotatably adjusted, a plurality of seats arranged thereon in a circle of a diameter corresponding to the diameter of the cutter, the upper faces of said seats being inclined at an angle corresponding to the relief angle of the tip surfaces of the blades, and means for holding the cutter head against rotation on said support.

5. A truing fixture for rotary face-mill cutters comprising a support, a plurality of members arranged on said support about a common axis and adapted to engage different blades of the cutter to be trued, and means on the support for locating said cutter so that its axis coincides with the common axis about which said tables are arranged.

6. A truing fixture for rotary face-mill cutters comprising a support, a plurality of members arranged on said support about a common axis and adapted to engage different blades of the cutter to be trued simultaneously to enable the blades to be brought into corresponding axial positions, and means on the support for locating said cutter so that its axis coincides with the axis about which said members are arranged.

7. A truing fixture for rotary face-mill cutters comprising a support having a plane upper face against which one face of the cutter to be trued seats, a plurality of blade-seats arranged about common center and adapted to engage, respectively, the several blades of the cutter, and means for centering the cutter on said support so that the center of said seats coincides with the center of the cutter.

SCHUYLER H. EARL.